United States Patent [19]

Weigelt

[11] Patent Number: 5,319,025
[45] Date of Patent: Jun. 7, 1994

[54] CURING FLUOROCARBON ELASTOMERS

[75] Inventor: Jeffrey D. Weigelt, St. Paul, Minn.

[73] Assignee: Minnesota Mining and Manufacturing Company, St. Paul, Minn.

[21] Appl. No.: 6,175

[22] Filed: Jan. 15, 1993

Related U.S. Application Data

[63] Continuation of Ser. No. 553,161, Jul. 13, 1990, Pat. No. 5,128,769.

[51] Int. Cl.$^5$ ............................................. C08F 8/32
[52] U.S. Cl. ............................... 525/151; 525/326.2; 525/326.3; 525/340; 525/351; 525/368; 525/369; 525/375
[58] Field of Search ............... 525/375, 151, 340, 351, 525/368, 369

[56] References Cited

U.S. PATENT DOCUMENTS

| | | | |
|---|---|---|---|
| 2,968,649 | 1/1961 | Pailthorp | 260/80.5 |
| 3,051,677 | 8/1962 | Rexford | 260/29.6 |
| 3,159,609 | 12/1964 | Harris et al. | 260/87.5 |
| 3,318,854 | 5/1967 | Honn et al. | 260/87.7 |
| 3,467,635 | 9/1969 | Brasen et al. | 260/80.76 |
| 3,752,787 | 8/1973 | de Brunner | 260/41 B |
| 3,857,807 | 12/1974 | Kometani et al. | 260/29.6 |
| 3,876,654 | 4/1975 | Pattison | 260/30.4 |
| 3,931,124 | 1/1976 | Kometani et al. | 525/375 |
| 3,951,913 | 4/1976 | Kometani et al. | 525/375 |
| 4,214,060 | 7/1980 | Apotheker et al. | 525/387 |
| 4,233,421 | 11/1980 | Worm | 525/343 |
| 4,259,463 | 3/1981 | Moggi et al. | 525/331 |
| 4,263,414 | 4/1981 | West | 525/102 |
| 4,287,320 | 9/1981 | Kolb | 525/340 |
| 4,358,559 | 11/1982 | Holcomb et al. | 524/380 |
| 4,446,270 | 5/1984 | Guenthner et al. | 524/433 |
| 4,882,390 | 11/1989 | Grootaert et al. | 525/326.3 |

FOREIGN PATENT DOCUMENTS 581641 12/1988 Australia.
57-154 1/1982 Japan.

OTHER PUBLICATIONS

Patent Abstracts of Japan, vol. 11 No. 53 (C-404) (2500), Feb. 19, 1987; & JP-A-61 213 253 (Japan Synthetic Rubber Co., Ltd) Sep. 22, 1986 *Abstract*.
West, A. C. and Holcomb, A. G., "Fluorinated Elastomers," Kirk-Othmer, *Encyclopedia of Chemical Technology*, vol. 8, pp. 500–515 (3rd ed., John Wiley & Sons, 1979).
Brullo, R. A., "Fluoroelastomer Rubber for Automotive Applications," *Automotive Elastomer & Design*, Jun. 1985.
"Fluoroelastomers Seal Up Automotive Future," *Materials Engineering*, Oct. 1988.
U.S. Defensive Publication T107, 801 (Nersasian), May 5, 1987.

*Primary Examiner*—Bernard Lipman
*Attorney, Agent, or Firm*—Gary L. Griswold; Walter N. Kirn; Robert H. Brink

[57] ABSTRACT

Fluorocarbon elastomer gum is compounded with curing agent comprising a polyhydroxy compound and a salt thereof with a salt-forming heterocyclic amine, the resulting compound gum is shaped and heated to form a cured shaped article such as automotive fuel line hose or O ring.

23 Claims, No Drawings

CURING FLUOROCARBON ELASTOMERS

This is a continuation of Application Ser. No. 07/553,161 filed Jul. 13, 1990 now U.S. Pat. No. 5,128,769.

This invention relates to fluorocarbon elastomers and their curing. In another aspect it relates to polyhydroxy compounds, e.g. bisphenols, used in curing fluorocarbon elastomers. In another aspect it relates fluorocarbon gum compositions containing a cure system comprising polyhydroxy compound. In another aspect it relates to a cured, shaped article of a fluorocarbon elastomer, such as automotive fuel line hose and O-ring seals. In a further aspect it relates to methods of compounding, shaping, and curing said gum compositions.

Fluorocarbon elastomers are synthetic elastomeric polymers with a high fluorine content—see, for example, West, A. C. and Holcomb, A. G., "Fluorinated Elastomers," Kirk-Othmer, Encyclopedia of Chemical Technology, Vol. 8, p. 500–515 (3rd ed., John=Wiley & Sons, 1979). These polymers are typically copolymers of vinylidene fluorine and hexafluoropropylene and terpolymers of these fluorine-containing olefins and tetrafluoroethylene. Gums of these polymers can be compounded with a curing system and other ingredients and shaped and then cured to produce various elastomeric articles and coatings having heat and chemical resistance and other properties which enable them to withstand hostile environments. Such compounded polymers are typically fabricated into automotive engine oil seals, fuel system components, such as fuel line hoses and O-ring seals, and drive train seals. Smaller, hotter-running automotive engines, modern fuel blends, and aggressive oil additives and other chemical substances used in operating the engines have made fluorocarbon elastomers the polymers of choice for a host of elastomeric engine components where reliable sealing is required and of environmental concern—see Brullo, R. A., "Fluoroelastomer Rubber for Automotive Applications," Automotive Elastomer & Design, June 1985, and "Fluoroelastomers Seal Up Automotive Future," *Materials Engineering*, October, 1988.

Most commercially available fluorocarbon elastomers, such as the illustrative polymers described above and sold, for example, under the trademarks "Fluorel" and "Viton", are crosslinked with aromatic polyhydroxy compounds, such as bisphenols, which are compounded with the elastomeric gum along with a curing accelerator, such as a quaternary phosphonium salt, and acid acceptors, such as magnesium oxide and calcium hydroxide—see, for example, U.S. Pat. No. 4,287,320 (Kolb).

U.S. Defensive Publication T107,801 (Netsasian) discloses inter alia adding to a brominated fluoroelastomer a bisphenol, a dialkylaminopyridine or a diazabicyclo compound, and a quaternary phosphonium compound, and Jap. Pat. Application Publication Kokai JP57-154 discloses a fluorine-containing elastomer mixed with an aromatic polyhydroxy compound, quaternary phosphonium compound, and 1,8-diazabicyclo[5.4.0]-7-undecene, 1,5-diazabicyclo-[4.30]-5-nonene, or 4-dialkylaminopyridine. In both of these publications, the polyhydroxy compounds and the heterocyclic amine are separately added to the elastomer gum to be compounded.

Briefly, in one aspect of this invention, an elastomeric composition is provided comprising fluorocarbon elastomer gum, such as a copolymer of vinylidene fluoride and hexafluoropropylene, compounded (mixed) with a crosslinking agent comprising (1) polyhydroxy compound and (2) a salt of (A) a polyhydroxy compound, such as bisphenol, e.g., 2,2-bis(4-hydroxyphenyl)hexafluoropropane (sometimes called "Bisphenol AF"), which can be represented by the structure

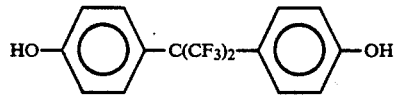

and (B) a salt-forming heterocyclic amine compound having two nitrogen atoms, at least one of which is a ring atom, such as 1,8-diazabicyclo[5.4.0]-7-undecene (abbreviated herein as "DBU") which can be represented by the structure:

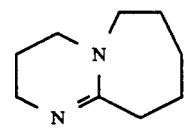

A preferred salt is that formed by reaction of the compounds of formulas I and II. In a further aspect of this invention, the cure system of the fluorocarbon elastomer composition preferably further comprises an organo-onium compound, which functions as a cure accelerator, and an inorganic acid acceptor, such as magnesium oxide and calcium hydroxide. And the elastomer composition can also contain fillers such as carbon black and processing aids such as fluoroaliphatic sulfonamide or diorgano sulfur oxide.

The elastomer gum and the other above-described chemical substances are compounded or mixed in one or, preferably, several steps and then shaped by extrusion (for example, in the form of a hose or hose lining) or molding (for example, in the form of an O-ring seal) and heated to cure the composition and form a cured elastomeric article.

The above-described gum compounded with crosslinking agent (i.e., free polyhydroxy compound and said salt) has a relatively long shelf-life and can be handled and used as described in a relatively safe and efficient manner without scorching or premature curing of the elastomer gum, in contrast, for example, to the free or non-salt amine compound of formula II which is difficult to handle and causes dehydrofluorination during incorporation into the fluoroelastomer, as stated in U.S. Pat. No. 3,857,807 (Kometani et al.).

The above-described fluorocarbon elastomer composition of this invention has good processing safety and scorch resistance and excellent cure rate. The resulted cured elastomer has excellent elastomeric properties and good compression set resistance.

Particularly useful articles that can be fabricated from the fluorocarbon elastomer compositions of this invention are fluoroelastomer automotive components, such as those described in the two above-cited journal articles of Brullo, e.g., fuel line hoses.

The polyhydroxy compound used in its free or non-salt form and as the anionic part of the salt component of the crosslinking agent can be any of those polyhydroxy compounds known in the art to function as a crosslinking agent or co-curative for fluoroelastomers, such as those polyhydroxy compounds disclosed in U.S. Pat. Nos. 4,259,463 (Moggi et al), 3,876,654 (Pattison), 4,233,421 (Worm), and U.S. Defensive Publication T107,801 (Netsasian). For example, representative aromatic polyhydroxy compounds include any one of the following: di-, tri-, and tetrahydroxybenzenes, naphthalenes, and anthracenes, and bisphenols of the formula

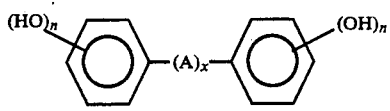

wherein A is a difunctional aliphatic, cycloaliphatic, or aromatic radical of 1 to 13 carbon atoms, or a thio, oxy, carbonyl, sulfinyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or al. kyl radical with, for example, 1 to 8 carbon atoms. It will be understood from the above bisphenol formula III that the —OH groups can be attached in any position (other than number one) in either ring. Blends of two or more such compounds can also be used. One of the most useful aromatic polyphenols is the bisphenol compound known as Bisphenol AF, which is 2,2-bis(4-hydroxyphenyl)hexafluoropropane. The compounds 4,4'-dihydroxydiphenyl sulfone (Bisphenol S ) and 2,2-bis(4-hydroxyphenyl ) propane (Bisphenol A) are also considered useful in this invention. Another useful aromatic polyhydroxy compound is hydroquinone. Others are dihydroxybenzenes such as catechol, resorcinol, 2-methyl resorcinol , 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Representative aliphatic polyhydroxy compounds which can also be used as the polyhydroxy compound in this invention include fluoroaliphatic diols, e.g. 1,1,6,6-tetrahydrooctafluorohexanediol, and others such as those described in U.S. Pat. No. 4,358,559 ( Holcomb et al. ) and references cited therein. Derivatives of polyhydroxy compounds can also be used such as those described in U.S. Pat. No. 4,446,270 (Guenthner et al.) and include, for example, 2- ( 4-allyloxyphenyl ) -2- ( 4-hydroxyphenyl ) propane. Mixtures of two or more of the polyhydroxy compounds can be used.

The heterocyclic amine compound combined with the polyhydroxy compound to form the salt, used as a component of the crosslinking agent according to this invention, can be any of those disclosed, for example, in said U.S. Defensive Publication T107,801. One class of said cyclic amines are dialkylaminopyridines, each of the alkyl groups of which can contain 1 to 5 carbon atoms; such compounds can be represented by the formula:

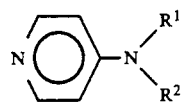

where $R^1$ and $R^2$ are alkyl groups that can be the same or different and independently contain i to 5 carbon atoms, or said $R^1$ and $R^2$ can be connected together to form, with the N-atom to which they are bound, a heterocyclic ring. Another class of cyclic amines which can be used to form the cation part of the salt of this invention is diazabicyclo compounds, such as those represented by the formulas:

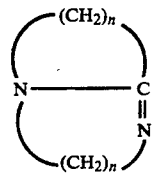

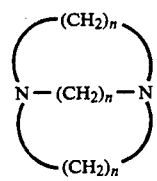

where, in formulas V and VI, each subscript n is independently an integer of 2 to 8.

Representative dialkylaminopyridines of formula IV include p-dimethylaminopyridine, dipropylaminopyridine, and 4-pyrollidinopyridine. Representative diazabicyclo compounds of formula V include 1,4-diazabicyclo [2.2.2]octane and of formula VI include 1,5-diazabicyclo [4.3.0]-5-nonene and 1,8-diazabicyclo[5.4.0]-7-undecene (the structure of which is depicted in formula II, supra).

Any of the polyhydroxy compounds can be reacted in a salt-forming reaction with any of the heterocyclic amines to form the salt of this invention, the anion part of the salt being derived from the polyhydroxy compound and the cation part from the cyclic amine. The salt is prepared and then added, mixed, or compounded with fluorocarbon elastomer gum (and such salts can be called pre-formed or ex-situ salts). One way of carrying out the salt-forming reaction is to add the heterocyclic amine to a solution of an equal molar amount or, preferably, a slight excess (e.g. about 10% excess) of the polyhydroxy compound in an alcohol, such as methanol, while stirring or agitating the solution. After the salt-forming, exothermic reaction is over and the solution of reaction product (salt) is allowed to cool, the solution can be incorporated in, or added to, the fluorocarbon elastomer gum, for example by adding the solution to the gum as it is milled on a two-roll mill, the solvent alcohol being volatilized during the milling. Alternatively, the solution of the salt can be dried to volatilize the solvent and the salt can be added as a particulate solid to the gum being milled on the mill.

The amount of the crosslinking agent of this invention, and its relative amounts of its salt and free polyhydroxy compound components, added to the gum will be those amounts sufficient to obtain the desired cure rate of the of the compounded gums and physical properties of the cured article thereof.

The organo-onium compound which can be incorporated into or compounded with the fluoroelastomer gum as a co-curing agent or vulcanization accelerator include those known and described in the art—see, for example, the description of such organo-onium compounds in U.S. Pat. No. 4,882,390 (Grootaert et al.) The organo-onium compounds which can be used include quaternary organo-onium compounds, such as ammonium, arsonium, phosphonium, stibonium, amino-phosphonium, phosphorane (e.g., triarylphosphorane), and iminium compounds, and sulfonium compounds. Mixtures of organo-onium compounds are also useful in this invention. The ammonium, phosphonium, arsonium, and stibonium salts or compounds preferably have the general formula:

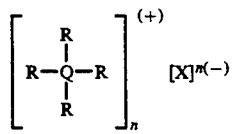

where Q is nitrogen, phosphorous, arsenic or antimony; X is an organic or inorganic anion (e.g., halide, sulfate, acetate, phosphate, phosphonate, hydroxide, alkoxide, phenoxide, or bisphenoxide); n is equal to the valence of the anion X; and each R is independently an alkyl, aryl, alkenyl, or combinations thereof. Each R can be substituted with chlorine, fluorine, bromine, cyano, —OR' or —COOR' where R' is a $C_1$ to $C_2$ alkyl, aryl, aralkyl, or alkenyl. Any pair of the R groups can be connected with each other and with the Q atom to form a heterocyclic ring. A preferred organo-onium compound where the aromatic polyhydroxy compound used is Bisphenol AF, is where in formula VII the Q is phosphorous, X is a chloride anion, n is 1, and three of the R groups are phenyl moieties and the remaining R group is a benzyl moiety. A preferred class of formula VII is where at least one of the R groups is alkyl or alkenyl. In another class of quaternary organo-onium compounds which can be used in this invention, the nitrogen, phosphorus, arsenic or antimony atom may be a heteroatom in a cyclic structure, e.g., 8-benzyl-l,8-diazabicyclo[5,4,0]-7-undecenium chloride. Another class which can be used is amino-phosphonium compounds, some of which are described, for example, in U.S. Pat. No. 4,259,463 (Moggi et al). Another useful class is phosphorane compounds disclosed, for example, in U.S. Pat. Nos. 3,752,787 (de Brunner) and 4,882,390 (Grootaert et al.). Another class of quaternary organo-onium compounds useful in this invention are iminium compounds, where are also described in said U.S. Pat. No. 4,882,390.

The compounded gum formulation of this invention can also include processing agents, such as those conventionally used to aid in the molding or extrusion of the formulation. Fluoroaliphatic sulfonamide can also be used as processing aid, such compounds being described, for example, in Australian Pat. No. 581,641 (Guenthner et al.), including those of the formula $R_fSO_2NHR''$, where $R_f$ is a fluoroaliphatic radical such as a perfluoroalkyl, e.g., $C_nF_{2+1}$ where n is 4 to 20, or perfluorocycloalkyl, e.g., $C_nF_{2+n}$ where n is 5 to 20. Representative fluoroaliphatic sulfonamide compounds useful in this invention include:

$C_4F_9SO_2NHCH_3$
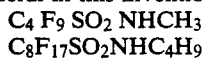

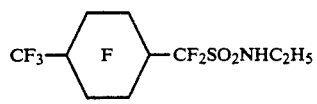

$C_8F_{17}SO_2NHCH_3$
$C_8F_{17}SO_2NHCH_2CH=CH_2$
$C_8F_{17}SO_2NH_2$
$C_8F_{17}SO_2NHCH_2OCH=CH_2$ and
$C_8F_{17}SO_2NHCH_2CH_2CONH_2$.

Another type of processing aid which can be used in this invention is diorgano sulfur oxides, such as those described in U.S. Pat. No. 4,287,320 (Kolb).

Fillers can be mixed with the fluoroelastomer gum to improve molding characteristics and other properties. When a filler is employed, it can be added to the vulcanization recipe in amounts of up to about 100 parts per hundred parts by weight of gum, preferably between about 15 to 50 parts per hundred parts by weight of the gum. Examples of fillers which may be used are reinforcing thermal grade carbon blacks or non-black pigments of relatively low reinforcement characteristics such as clays and barytes.

Fluorocarbon elastomers which can be used in this invention include those described, for example, in the aforementioned prior art, e.g., U.S. Pat, Nos, 3,,159,609 (Harris et al.), 3,467,635 (Brasen et al), 4,214,060 (Apotheker), 4,233,421 (Worm), and 4,263,414 (West). Some of these are commercially available, sold under trademarks such as "Fluorel" and "Viton", and are copolymers whose interpolymerized units are derived from vinylidene fluoride and one or more other co-monomers. Among the fluoroelastomer polymers which may be compounded in accordance with this invention are the elastomeric copolymers whose interpolymerized units are derived from two or more of the following fluoromonomers: vinylidene fluoride, hexafluoropropene, chlorotrifluoroethylene, 2-chloropentafluoropropene, fluorinated methyl vinyl ether, tetrafluoroethylene, 1-hydropentafluoropropene, dichlorodifluoroethylene, trifluoroethylene, 1,1-chlorofluoroethylene, and mixtures thereof. Said fluoromonomers may also be copolymerized with other compounds such as non-fluorinated alpha-olefin co-monomers, e.g., ethylene or propylene. The preferred elastomers are copolymers of vinylidene fluoride with at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, lower fluoroalkyl radical, or lower fluoroalkoxy radical; particularly preferred are hexafluoropropene, tetrafluoroethylene, chlorotrifluroethylene, and 1-hydropentafluoropropene. Particularly preferred are the fluorinated elastomers produced by copolymerizing vinylidene fluoride with hexafluoropropene, and described in U.S. Pat. Nos. 3,051,677 (Rexford) and 2,968,649 (Pailthorp et al.), and those copolymers produced by copolymerizing vinylidene fluoride, hexafluoropropene, and tetrafluoroethylene as described in U.S. Pat No. 3,318,854 (Honn et al.). The elastomeric copolymers of hexafluoropropene and vinylidene fluoride preferably will have between about 15l and about 50 mole percent hexafluoropropene, optionally with the addition of up to 30 mole percent tetrafluoroethylene. Mixtures or blends of elastomers, e.g., of different viscosities, are also suitable.

The relative amounts of the various ingredients in preferred fluorocarbon elastomer compositions of this invention chosen to provide the desired cure rate and degree of cure are set forth in the table below, where the amounts given are in terms of millimoles per 100 parts by weight of the elastomer gum, "mmhr", or as parts per 100 parts by weight of the gum, "phr".

TABLE I

| INGREDIENTS | AMOUNT | |
|---|---|---|
| | GENERAL | PREFERRED |
| Salt (of polyhydroxy compound and heterocyclic amine | 0.3 to 33 mmhr | 0.6 to 5 mmhr |
| Polyhydroxy compound | 1.5 to 15 mmhr | 3 to 6 mmhr |
| Organo-onium compound | 0 to 5.0 mmhr | 0.02 to 2.5 mmhr |
| Bivalent metal oxide and/or hydroxide | 2 to 30 phr | 5 to 20 phr |

In accordance with this invention, the desired amounts of compounding ingredients and other conventional adjuvants or ingredients are added to the unvulcanized fluorocarbon gum stock and intimately admixed or compounded therewith by employing any of the usual rubber mixing devices such as Banbury mixers, roll mills, or any other convenient mixing device. The temperature of the mixture on the mill typically will not rise above about 120° C. During milling the components and adjuvants are distributed uniformly throughout the gum. The curing process typically comprises extrusion of the compounded mixture or pressing the compounded mixture in a mold, e.g., a cavity or a transfer mold, and subsequent oven-curing. Pressing of the compounded mixture (press cure) is usually conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent, such as a silicone oil, and prebaked. The molded vulcanizate is then usually post-cured (oven-cured) at a temperature usually between about 150° C. and about 315° C., typically at about 232° C., for a period of from about 2 hours to 50 hours or more depending on the cross-sectional thickness of the article.

Objects and advantages of this invention are illustrated in the following examples.

EXAMPLES

In the examples, indicated results were obtained using the following test methods:

Mooney Viscosity: ASTM D1646-81

Cure Rheology: Tests were run on uncured, compounded admixture using the Oscillating Disk Rheometer (ODR) Model 100S in accordance with ASTM D 2084-82 with a micro die, no preheat, an oscillator frequency of 100 cpm and a 3° arc. Minimum torque ($M_L$) and highest torque attained during specified period of time when no plateau or maximum torque is obtained ($M_H$) were reported. Also reported were $t_s0.2$ (times for torque to increase 0.2 N.m above ML), t'50 [time for torque to reach $M_L+0.5(M_H-M_L)$], and t'90 time for torque to reach $M_L+0.9(M_H-M_L)$].

Press Cure: Unless otherwise noted, 150×150×1.8 mm sheets were prepared for physical property determination by pressing at about $6.9\times10^3$ kPa for 15 min. at 177° C.

Post Cure: Samples were removed from the press and placed in a circulating air oven. The oven was maintained at 230° C. for 16 hours.

| Tensile Strength at Break Elongation at Break, and Modulus at 100% Elongation | ASTM D 412-75 on the sample cut from 1.8 mm sheet with ASTM Die D. |
|---|---|

Hardness: ASTM D 2240-85 Method A. Type A-2 shore Durometer was used.

Mooney Scorch: Tests were run on uncured, compounded formulations using a Mooney Viscometer, Model ST1, Scott Testing Inc. in accordance with ASTM D1646-81 with a 1 minute preheat and a small rotor at 121° C.

In the examples the salt of this invention was prepared as follows. To a solution of 369.6 g (1.1 mole) of Bisphenol AF in 369.6 g methanol was added, while stirring, 152.1 g (1.0 mole) of DBU. The homogeneous solution which framed in the exothermic reaction contained the Bisphenol AF.DBU salt. The components of the solution comprised 42.1 wt % Bisphenol AF, 15.8 wt % DBU and 42.1 wt., % methanol. This solution of Bisphenol-AF.DBU salt was used in Examples 1-9, 12, 16-20.

In the examples, three different commercial fluorocarbon gums were compounded with various ingredients in accordance with this invention, the compounded gums were cured, and the cured fluoroelastomers were tested. (Comparison gum formulations were also made, cured, and tested). The fluoroelastomer gums were those whose interpolymerized units were derived from the monomers described in Table II.

TABLE II

| Fluoroelastomer gum type | Mooney viscosity of gum at 121° C. | Amt. of monomer, mole % | | |
|---|---|---|---|---|
| | | $CF_2=CH_2$ | $CF_2=CFCF_3$ | $CF_2=CF_2$ |
| A | 37 | 78 | 22 | 0 |
| B | 75 | 61 | 19 | 20 |
| C | 38 | 59.2 | 19 | 21.8 |

The ingredients used in each composition were compounded on a two-roll mill. The compounded gumstocks were evaluated for cure rheology characteristics in accordance with the methods described above. Most samples were press-cured then post-cured, and physical properties then obtained. In some cases Mooney Scorch properties were tested and physical properties after thermal aging (following press-cure and post-cure) were tested.

EXAMPLE 1 AND COMPARISON EXAMPLES C1 TO C3

Table III summarizes the composition of a compounded gum of this invention and the cure properties thereof. Also given in the table are similar data of Comparison Examples C1, C2 and C3, which did not contain the novel salt, Bisphenol AF-DBU, of this invention.

TABLE III

| | Examples | | | |
|---|---|---|---|---|
| | 1 | C1 | C2 | C3 |
| Compounded Gum Composition | | | | |
| Fluoroelastomer: Type B of Table II (parts) | 100 | 100 | 100 | 100 |

TABLE III-continued

|  | Examples |  |  |  |
|---|---|---|---|---|
|  | 1 | C1 | C2 | C3 |
| Carbon Black (phr) | 30 | 30 | 30 | 30 |
| Ca(OH)$_2$ (phr) | 6 | 6 | 6 | 6 |
| MgO (phr) | 3 | 3 | 3 | 3 |
| Free Bisphenol AF (mmhr) | 3.46 | 4.76 | 4.76 | 4.76 |
| Bisphenol AF.DBU (mmhr) | 1.3 |  |  |  |
| Triphenylbenzylphosphonium chloride (mmhr) |  | 1.3 | 1.3 |  |
| 8-Benzyl-1,8-diazabicyclo[5.4.0]-7-undecenium chloride (mmhr) |  |  |  |  |
| DBU (mmhr) |  |  |  | 1.3 |
| Cure Rheology |  |  |  |  |
| M$_L$ N.m) | 2.49 | 2.60 | 2.37 | 2.26 |
| M$_H$ (N.m) | 13.00 | 8.48 | 4.41 | 10.62 |
| t$_S$ 0.2 | 1.4 | 1.8 | 5.3 | 2.8 |
| t'50 | 2.2 | 3 | 9.5 | 4.6 |
| t'90 | 2.9 | 3.7 | 11.7 | 7 |
| Mooney Scorch (MS + 1 at 121° C.) |  |  |  |  |
| Minimum Torque (N.m) | 7.46 | 7.68 | 8.14 | 6.33 |
| N.m rise in 25 min | 2.26 | 0.68 | 0.23 | 0 |
| Press Cure Properties (10 min at 177° C.) |  |  |  |  |
| Tensile (MPa) | 10.77 | 10.70 | 9.99 | 9.66 |
| Elongation (%) | 229 | 382 | 445 | 308 |
| 100% Modulus (MPa) | 5.11 | 3.46 | 2.68 | 3.74 |
| Hardness (Shore A2) | 76 | 77 | 72 | 74 |
| Post Cure Properties (16 Hr at 232° C.) |  |  |  |  |
| Tensile (MPa) | 15.39 | 13.94 | 15.85 | 16.77 |
| Elongation (%) | 142 | 277 | 267 | 193 |
| 100% Modulus (MPa) | 9.10 | 4.32 | 2.84 | 6.47 |
| Hardness (Shore A2) | 80 | 78 | 75 | 77 |
| Thermal Aged Properties (70 Hrs at 275° C.) |  |  |  |  |
| Tensile (MPa) | 9.42 | 6.66 | 7.37 | 8.52 |
| Elongation (%) | 179 | 461 | 460 | 261 |
| 100% Modulus (MPa) | 4.76 | 2.61 | 2.28 | 3.14 |
| Hardness (Shore A2) | 78 | 75 | 77 | 76 |
| Compression Set of Cured O-Rings (70 Hrs at 200° C. (%) | 29.6 | 40.2 | 52.1 | 29.5 |

The compounded gum of Example 1 (illustrative of this invention) cured faster and had a higher maximum torque, M$_H$, than was the case with the comparison examples, C1, C2, C3. With this increase in cure efficiency, the desired cure rheology can be obtained with less curative of this invention than that required of conventional curatives to obtain such rheology. Also, the improved physical properties obtained after curing and the good compression set resistance of the cured elastomer of Example 1 are noteworthy. The higher tensile strength and modulus of the cured elastomer composition of Example 1 indicate that the free Bisphenol AF curing agent is better utilized when the Bisphenol AF-DBU salt is present.

EXAMPLE 2 AND COMPARISON EXAMPLES C4, C5

Another fluoroelastomer gum was compounded according to this invention (Example 2) along with Comparison Examples C4 and C5, and the compounded gums were cured and tested. Table IV summarizes the data which show the good cure rheology, physical properties and compression set resistance obtained for the elastomer composition of Example 2 containing a bisphenol amine salt of this invention. Comparative Examples C4 and C5, where no cure was obtained, show that bisphenol alone (Comparison C4) or DBU alone (Comparison Example C5) will not cure the fluoroelastomer.

TABLE IV

|  | Examples |  |  |
|---|---|---|---|
|  | 2 | C4 | C5 |
| Compounded Gum Composition |  |  |  |
| Fluoroelastomer: Type A of Table II (parts) | 100 | 100 | 100 |
| Carbon Black (phr) | 30 | 30 |  |
| Ca(OH)$_2$ (phr) | 6 | 6 | 6 |
| MgO (phr) | 3 | 3 | 3 |
| Free Bisphenol AF (mmhr) | 4.65 | 4.76 |  |
| Bisphenol AF.DBU (mmhr) | 1.03 |  |  |
| DBU (mmhr) |  |  | 1.03 |
| Cure Rheology |  |  |  |
| M$_L$ (N.m) | 1.13 | No cure | No cure |
| M$_H$ (N.m) | 11.64 |  |  |
| t$_S$ 0.2 | 2.0 |  |  |
| T'50 | 3.4 |  |  |
| t'90 | 5.1 |  |  |
| Mooney Scorch (MS + 1 at 121° C.) |  |  |  |
| Minimum Torque (N.m) | 4.07 |  |  |
| N.m rise in 25 min | 0.11* |  |  |
| Press Cure Properties (10 min at 177° C.) |  |  |  |
| Tensile (MPa) | 8.77 |  |  |
| Elongation (%) | 247* |  |  |
| 100% Modulus (MPa) | 4.18 |  |  |
| Hardness (Shore A2) | 73 |  |  |
| Post Cure Properties (16 Hr at 232° C.) |  |  |  |
| Tensile (MPa) | 15.87 |  |  |
| Elongation (%) | 186 |  |  |
| 100% Modulus (MPa) | 6.93 |  |  |
| Hardness (Shore A2) | 74 |  |  |
| Compression Set of Cured O-Rings | 21.5 |  |  |

TABLE IV-continued

| | Examples | | |
|---|---|---|---|
| | 2 | C4 | C5 |
| 70 Hrs. at 200° C.) (%) | | | |

*In a run like that of Example 2, but with no free bisphenol in the gum composition, the compounded gum cured too fast and scorched at 3.5 min. and had an elongation of 600%.

EXAMPLES 3 TO 8

Various compounded elastomer gum formulations of this invention were made that show that the addition of an organo-onium cure accelerator improves the cure rheology, i.e., gives faster curing, without adversely affecting physical properties. These examples and results thereof are summarized in Table V.

TABLE VII

| | Salt Solution Composition | | | |
|---|---|---|---|---|
| | Polyhydroxy compound | | Amt. DBU | Amt. CH$_3$OH |
| Salt | type used | amt. wt % | wt % | wt % |
| A | Bisphenol A* | 22.8 | 15.2 | 19.8 |
| B | Bisphenol S** | 40 | 20 | 20 |
| C | Hydroquinone | 19.8 | 27.2 | 53.2 |

*2,2-Bis(4-hydroxyphenyl)propane
**Bis(4-hydroxyphenyl)sulfone

TABLE VI

| | Examples | | |
|---|---|---|---|
| | 9 | 10 | 11 |
| Compounded Gum Composition | | | |
| Fluoroelastomer: Type A of Table II | 100 | 100 | 100 |

TABLE V

| | Examples | | | | | |
|---|---|---|---|---|---|---|
| | 3 | 4 | 5 | 6 | 7 | 8 |
| Compounded Gum Composition | | | | | | |
| Fluoroelastomer: Type B of Table II (parts) | 100 | 100 | 100 | 100 | 100 | 100 |
| Carbon Black (phr) | 30 | 30 | 30 | 30 | 30 | 30 |
| Ca(OH)$_2$ (phr) | 6 | 6 | 6 | 6 | 6 | 6 |
| MgO (phr) | 3 | 3 | 3 | 3 | 3 | 3 |
| Free Bisphenol AF (mmhr) | 3.94 | 3.94 | 3.94 | 3.94 | 3.94 | 3.94 |
| Bisphenol AF.DBU (mmhr) | 0.82 | 0.82 | 0.82 | 0.82 | 0.82 | 0.82 |
| Triphenylbenzylphosphonium chloride (mmhr) | | 0.25 | | | | |
| Tributyl(2-methoxy)propylphosphonium chloride (mmhr) | | | 0.25 | | | |
| Triphenylsulfonium chloride (mmhr) | | | | 0.25 | | |
| Tributylbenzylphosphonium chloride (mmhr) | | | | | 0.25 | |
| Tributylallyphosphonium bromide (mmhr) | | | | | | 0.25 |
| Cure Rheology | | | | | | |
| M$_L$ (N.m) | 1.07 | 1.19 | 1.24 | 1.19 | 1.24 | 1.13 |
| M$_H$ (N.m) | 10.74 | 12.20 | 12.43 | 11.53 | 12.32 | 11.98 |
| t$_S$ 0.2 | 2.5 | 2.2 | 1.6 | 1.8 | 1.4 | 1.6 |
| t'50 | 4.9 | 3.5 | 2.6 | 3.1 | 2.4 | 2.6 |
| t'90 | 8.0 | 4.5 | 3.5 | 4.5 | 3.8 | 3.7 |
| Mooney Scorch (MS + 1 at 121° C.) | | | | | | |
| Minimum Torque) (N.m) | 3.39 | 3.73 | 3.73 | 3.96 | 4.07 | 3.62 |
| N.m rise in 25 min | 0.11 | 0.11 | 0.11 | 0.23 | 8.59 | 1.13 |
| Press Cure Properties (10 min at 177° C.) | | | | | | |
| Tensile (MPa) | 9.23 | 9.66 | 9.74 | 9.53 | 9.74 | 9.33 |
| Elongation (%) | 291 | 270 | 273 | 286 | 282 | 269 |
| 100% Modulus (MPa) | 3.68 | 3.88 | 4.12 | 3.97 | 4.20 | 3.94 |
| Hardness (Shore A2) | 71 | 71 | 73 | 71 | 71 | 71 |
| Post Cure Properties (16 Hr at 232° C.) | | | | | | |
| Tensile (MPa) | 14.64 | 14.26 | 15.03 | 15.50 | 14.61 | 15.45 |
| Elongation (%) | 189 | 176 | 182 | 193 | 178 | 191 |
| 100% Modulus (MPa) | 5.99 | 6.42 | 6.64 | 6.50 | 6.90 | 6.45 |
| Hardness (Shore A2) | 72 | 75 | 76 | 75 | 75 | 73 |
| Thermal Aged Properties (70 Hrs at 275° C.) | | | | | | |
| Tensile (MPa) | 9.23 | 9.61 | 9.11 | 9.32 | 9.38 | 9.41 |
| Elongation (%) | 206 | 201 | 181 | 209 | 187 | 194 |
| 100% Modulus (MPa) | 3.86 | 4.23 | 4.74 | 4.32 | 4.73 | 4.39 |
| Hardness (Shroe A2) | 75 | 76 | 76 | 76 | 76 | 75 |
| Compression Set of Cured O-Rings (70 Hrs at 200° C.) (%) | 20.6 | 19.8 | 20.1 | 21.3 | 22.9 | 22.3 |

EXAMPLES 9-11

These examples, summarized in Table VI, illustrate the use in the curing of fluoroelastomer gum with methanol solutions of salts of various aromatic polyhydroxy compounds (or bisphenols) with DBU. These solutions were prepared as described above for the Bisphenol AF.DBU salt. The compositions of these methanol solutions of the salt are shown below in Table VII. Good cure rates and physical properties were obtained in all examples.

| (parts) | | | |
|---|---|---|---|
| Carbon Black (phr) | 30 | 30 | 30 |
| Ca(OH)$_2$ (phr) | 6 | 6 | 6 |
| MgO (phr) | 3 | 3 | 3 |
| Bisphenol A (mmhr) | 5.0 | | |
| Bisphenol S (mmhr) | | 5.0 | |
| Hydroquinone (mmhr) | | | 4.4 |
| Salt of Table VII (mmhr): | | | |
| A | 1.00 | | |
| B | | 1.00 | |
| C | | | 1.6 |
| Cure Rheology | | | |
| M$_L$ (N.m) | 1.36 | 1.36 | 1.92 |
| M$_H$ (N.m) | 11.30 | 8.93 | 12.43 |
| t$_S$ 0.2 | 1.6 | 3.9 | 0.8 |
| t'50 | 2.7 | 6.7 | 1.5 |
| t'90 | 4.7 | 8.7 | 2.8 |

TABLE VI-continued

|  | Examples | | |
|---|---|---|---|
|  | 9 | 10 | 11 |
| Press Cure Properties (10 min at 177° C.) | | | |
| Tensile (MPa) | 10.14 | 10.32 | 8.57 |
| Elongation (%) | 245 | 350 | 223 |
| 100% Modulus (MPa) | 4.27 | 3.01 | 4.25 |
| Hardness (Shore A2) | 72 | 70 | 72 |
| Post Cure Properties (16 Hr at 232° C.) | | | |
| Tensile (MPa) | 13.36 | 12.71 | 13.77 |
| Elongation (%) | 172 | 186 | 138 |
| 100% Modulus (MPa) | 5.92 | 4.72 | 8.80 |
| Hardness (Shore A2) | 75 | 72 | 74 |
| Compression Set of Cured O-Rings (70 Hrs at 200° C.) (%) | 26 | 28 | 30.5 |

EXAMPLES 12–15

These examples, summarized in Table VIII, show the curing of elastomer gums with the use of methanol solutions of salts of Bisphenol AF with various amines. The solutions were prepared as described for the Bisphenol AF.DBU salts. The compositions of these methanol solutions of complexes are given below in Table IX. All compositions gave satisfactory cure rates and physical properties.

TABLE IX

| Salt | Amine used | Salt Solution Composition | | |
|---|---|---|---|---|
|  |  | amt. wt % | Amt. of Bisphenol AF wt % | Amt. of CH$_3$OH wt % |
| D | DBU | 55.1 | 22.1 | 23.8 |
| E | DABCO* | 56.6 | 18.9 | 24.5 |
| F | DBN** | 55.6 | 20.5 | 23.9 |
| G | DMAP*** | 56.0 | 20.3 | 23.7 |

*4,4-Diazabicyclo[2.2.2]octane
**1,5-Diazabicyclo[4.3.0]-5-nonene
***4-(N,N-dimethylamino)pyridine

TABLE VIII

|  | Examples | | | |
|---|---|---|---|---|
|  | 12 | 13 | 14 | 15 |
| Compounded Gum Composition | | | | |
| Fluoroelastomer: Type A of Table II (parts) | 100 | 100 | 100 | 100 |
| Carbon Black (phr) | | | | |
| Ca(OH)$_2$ (phr) | | | | |
| MgO (phr) | | | | |
| Free Bisphenol AF (mmhr) | 4.95 | 4.95 | 4.95 | 4.95 |
| Salt of Table IX (mmhr): | | | | |
| D | 1.00 | | | |
| E |  | 1.00 | | |
| F |  |  | 1.00 | |
| G |  |  |  | 1.00 |
| Cure Rheology | | | | |
| Mhd L (N.m) | 1.13 | 0.85 | 1.13 | 1.13 |
| M$_H$ (N.m) | 13.00 | 9.83 | 3.62 | 6.78 |
| Min to M$_H$ | 12.0 | 36.0 | 24.0 | 12.0 |
| t$_S$ 0.2 | 2.5 | 17.5 | 2.8 | 3.5 |
| t'50 | 4.3 | 27.5 | 7.0 | 6.2 |
| t'90 | 6.2 | 32.7 | 17.0 | 8.6 |
| Press Cure Properties (10 min at 177° C.) | | | | |
| Cure Time | 10' | 60' | 60' | 10' |
| Tensile (MPa) | 9.92 | 11.88 | 8.95 | 10.92 |
| Elongation at Break (%) | 190 | 232 | 182 | 309 |
| 100% Modulus (MPa) | 5.15 | 4.38 | 2.05 | 3.40 |
| Hardness (Shore A2) | 73 | 71 | 65 | 70 |
| Post Cure Properties (16 Hr at 232° C.) | | | | |
| Tensile (MPa) | 17.24 | 16.06 | 14.56 | 14.66 |
| Elongation at Break (%) | 160 | 175 | 249 | 200 |
| 100% Modulus (MPa) | 8.69 | 6.57 | 4.16 | 5.59 |
| Hardness (Shore A2) | 74 | 72 | 68 | 73 |
| Compression Set of Cured O-Rings (70 Hrs at 200° C.) (%) | 19.1 | 17.1 | 34.1 | 30.1 |

EXAMPLES 16–19

Further compounded gum compositions of this invention were made, cured, and tested and illustrate the usefulness of also incorporating into the compositions the fluoroaliphatic sulfonamide, $C_8F_{17}SO_2N(H)CH_3$, as a processing aid. The processing aid was found to improve the processing of the fluoroelastomer gum on the 2-roll mill. This improved processing is desirable for the extrusion of a compounded gum into hoses useful as automotive fuel lines. These compositions and their properties are summarized in Table X. Other fluoroaliphatic sulfonamides which showed similar processing benefits were $C_8F_{17}SO_2N(Na)CH_3$, $C_8F_{17}SO_2N(CH_3)C_2H_4OH$, $C_8F_{17}SO_2N(H)C_{12}H_{25}$, $C_8F_{17}SO_2N(C_2H_5)CH_2CO_2H$, and $(C_8F_{17}SO_2N(C_2H_5)C_2H_4O)_2PO_2Na$.

Various modifications and alternations of this invention will become apparent to those skilled in the art without departing from the scope of spirit of this invention.

TABLE X

|  | Examples | | | |
|---|---|---|---|---|
|  | 16 | 17 | 18 | 19 |
| Compounded Gum Composition | | | | |

TABLE X-continued

| | Examples | | | |
|---|---|---|---|---|
| | 16 | 17 | 18 | 19 |
| Fluoroelastomer: Type C of Table II (parts) | 100 | 100 | 100 | 100 |
| Carbon Black (phr) | 30 | 30 | 30 | 30 |
| Ca(OH)$_2$ (phr) | 6 | 6 | 6 | 6 |
| MgO (phr) | 3 | 3 | 3 | 3 |
| Free Bisphenol AF (mmhr) | 2.73 | 2.73 | 2.73 | 2.73 |
| Bisphenol AF.DBU (mmhr) | 0.59 | 0.59 | 0.59 | 0.59 |
| Triphenylbenzylphosphonium chloride (mmhr) | | 0.26 | | 0.26 |
| C$_8$F$_{17}$SO$_2$N(H)CH$_3$ | | | 0.59 | 0.59 |
| Cure Rheology | | | | |
| M$_L$ (N.m) | 1.24 | 1.36 | 1.19 | 1.47 |
| M$_H$ (N.m) | 6.78 | 8.98 | 6.89 | 9.04 |
| t$_S$ 0.2 (min) | 4.2 | 2.5 | 4.0 | 2.2 |
| t'50 (min) | 7.0 | 3.8 | 6.9 | 3.2 |
| t'90 (min) | 9.1 | 4.8 | 8.9 | 4.1 |
| Press Cure Properties (10 min at 177° C.) | | | | |
| Tensile (MPa) | 9.49 | 9.57 | 9.14 | 9.73 |
| Elongation (%) | 384 | 349 | 423 | 360 |
| 100% Modulus (MPa) | 2.94 | 3.16 | 2.79 | 3.39 |
| Hardness (Shore A2) | 68 | 68 | 66 | 71 |

What is claimed is:

1. An elastomeric composition comprising a fluorocarbon elastomer gum, polyhydroxy compound, and at least 0.3 mmhr of a salt of an anion of a
   (A) polyhydroxy compound and a cation of a protonated
   (B) heterocyclic amine having two nitrogen atoms at least one of which is a ring atom, wherein said heterocyclic amine is a dialkylaminopyridine or a diazabicyclo compound.

2. The composition of claim 1 wherein each of said polyhydroxy compounds is an aromatic bisphenol.

3. The composition of claim 1 wherein each of said polyhydroxy compounds is 2,2-bis(4-hydroxyphenyl) hexafluoropropane.

4. The composition of claim 1 wherein said heterocyclic amine (B) is a dialkylaminopyridine.

5. The composition of claim 1 wherein said heterocyclic amine (B) is 4-(N,N-dimethylamino)pyridine.

6. The composition of claim 1 wherein said heterocyclic amine (B) is an amine of the formula:

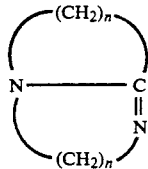

where each subscript n is independently an integer of 2 to 8.

7. The composition of claim 1 wherein said heterocyclic amine (B) is 4,4-diazabicyclo[2.2.2]octane.

8. The composition of claim 1 wherein said heterocyclic amine (B) is an amine of the formula:

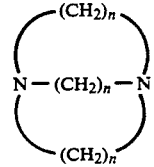

where each subscript n is independently an integer of 2 to 8.

9. The composition of claim 1 wherein said heterocyclic amine (B) is 1,8-diazabicyclo[5.4.0]-7-undecene.

10. The composition of claim 1 wherein said heterocyclic amine (B) is 1,5-diazabicyclo[d.3.0]-B-nonene.

11. The composition of claim 1 wherein both polyhydroxy compounds are 2,2-bis(4-hydroxyphenyl)-hexafluoroproane. and said heterocyclic amine (B) is 1,8-diazabicyclo[5.4.0]-7-undecene.

12. The composition of claim 1 further comprising an organo-onium compound.

13. The composition of claim 1 further comprising a quaternary phosphonium compound.

14. The composition of claim 1 further comprising triphenylbenzylphosphonium chloride.

15. The composition of claim 1 further comprising a fluoroaliphatic sulfonamide.

16. The composition of claim 1 further comprising C$_8$F$_{17}$SO$_2$N(H)CH$_3$.

17. The composition of claim 1 further comprising an acid acceptor.

18. The composition of claim 1 further comprising magnesium oxide and calcium hydroxide.

19. The composition of claim 1 wherein said gum is a polymer whose interpolymerized units are derived from vinylidene fluoride and one or more copolymerizable co-monomers.

20. An elastomeric composition which is curable in association with an inorganic acid acceptor, said composition comprising a fluorocarbon elastomer gum, free polyhydroxy compound, and at least 0.3 mmhr of an ex-situ salt of an anion or a polyhydroxy compound and a cation of a protonated heterocyclic amine having two nitrogen atoms at least one of which is a ring atom, wherein said heterocyclic amine is a dialkylaminopyridine or a diazabicyclo compound.

21. The composition of claim 20 wherein said free polyhydroxy compound, salt, and said organo-onium compound are present in said composition in amounts sufficient to crosslink said gum in an accelerated manner when heated in the presence of an inorganic acid acceptor.

22. A shaped article comprising the elastomeric composition of claim 1 in its curved state.

23. A method of compounding an elastomeric composition, comprising mixing fluorocarbon elastomer gum, polyhydroxy compound, and at least 0.3 mmhr of a salt of an anion of a polyhydroxy compound and a cation of a protonated heterocyclic amine having two nitrogen atoms at least one of which is a ring atom, wherein said heterocyclic amine is a dialkylaminopyridine or a diazabicyclo compound.

* * * * *

UNITED STATES PATENT AND TRADEMARK OFFICE
CERTIFICATE OF CORRECTION

PATENT NO. : 5,319,025
DATED : June 7, 1994
INVENTOR(S) : Jeffrey D. Weigelt Page 1 of 2

It is certified that error appears in the above-identified patent and that said Letters Patent is hereby corrected as shown below:

Col. 1, line 10, before "fluorocarbon" insert --to--.

Col. 1, line 21, delete "John=Wiley" and substitute therefor --John Wiley--.

Col. 2, line 48, delete "premature..curing" and substitute therefor --premature curing--.

Col. 3, line 22, delete "al.kyl" and substitute therefor --alkyl--.

Col. 5, line 25, delete "$C_2$" and substitute therefor --$C_{20}$--.

Col. 6, line 9, delete "fluore!" and substitute therefor --fluorel--.

Col. 6, line 60, delete "151" and substitute therefor --15--.

Col. 8, line 23, delete "framed" and substitute therefor --formed--.

Col. 9, line 35, delete "Example i" and substitute therefor --Example 1--.

Col. 14, line 55, delete "$C_8F_{17}SO_2N(NA)CH_3$" and substitute therefor --$C_8F_{17}SO_2N(CH_3)CH_3$--.

UNITED STATES PATENT AND TRADEMARK OFFICE
CERTIFICATE OF CORRECTION

PATENT NO. : 5,319,025

DATED : June 7, 1994

INVENTOR(S) : Jeffrey D. Weigelt

It is certified that error appears in the above-indentified patent and that said Letters Patent is hereby corrected as shown below:

Col. 8, lines 24, 27 and 62; Col. 10, line 48; Col. 11, in Table V and line 65; Col. 13, line 57; Col. 15 in Table X, delete each occurrence of "AF.DBU" and substitute therefor --AF•DBU--.

Signed and Sealed this

Eighth Day of November, 1994

Attest:

BRUCE LEHMAN

Attesting Officer

Commissioner of Patents and Trademarks